Patented Dec. 30, 1924.

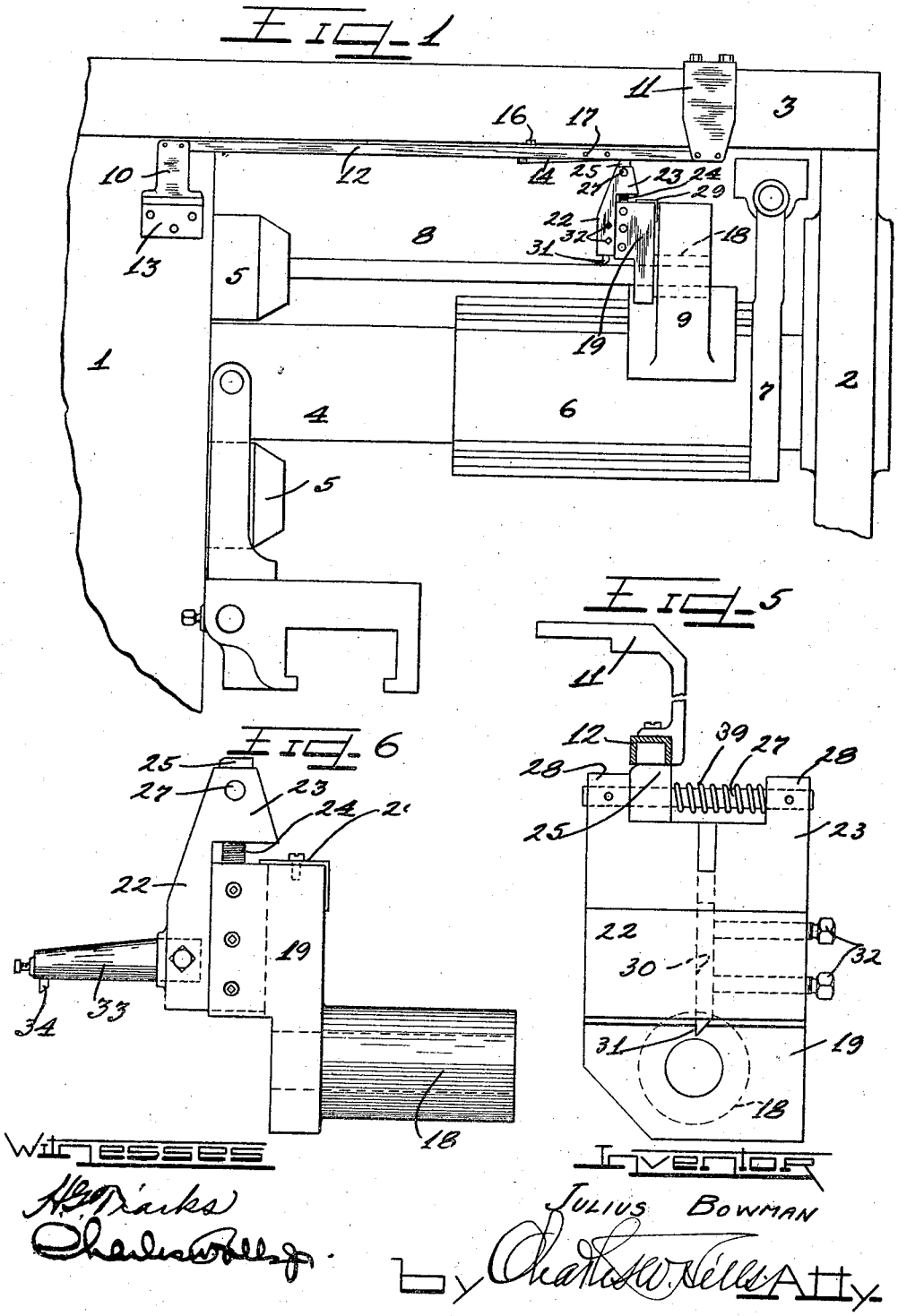

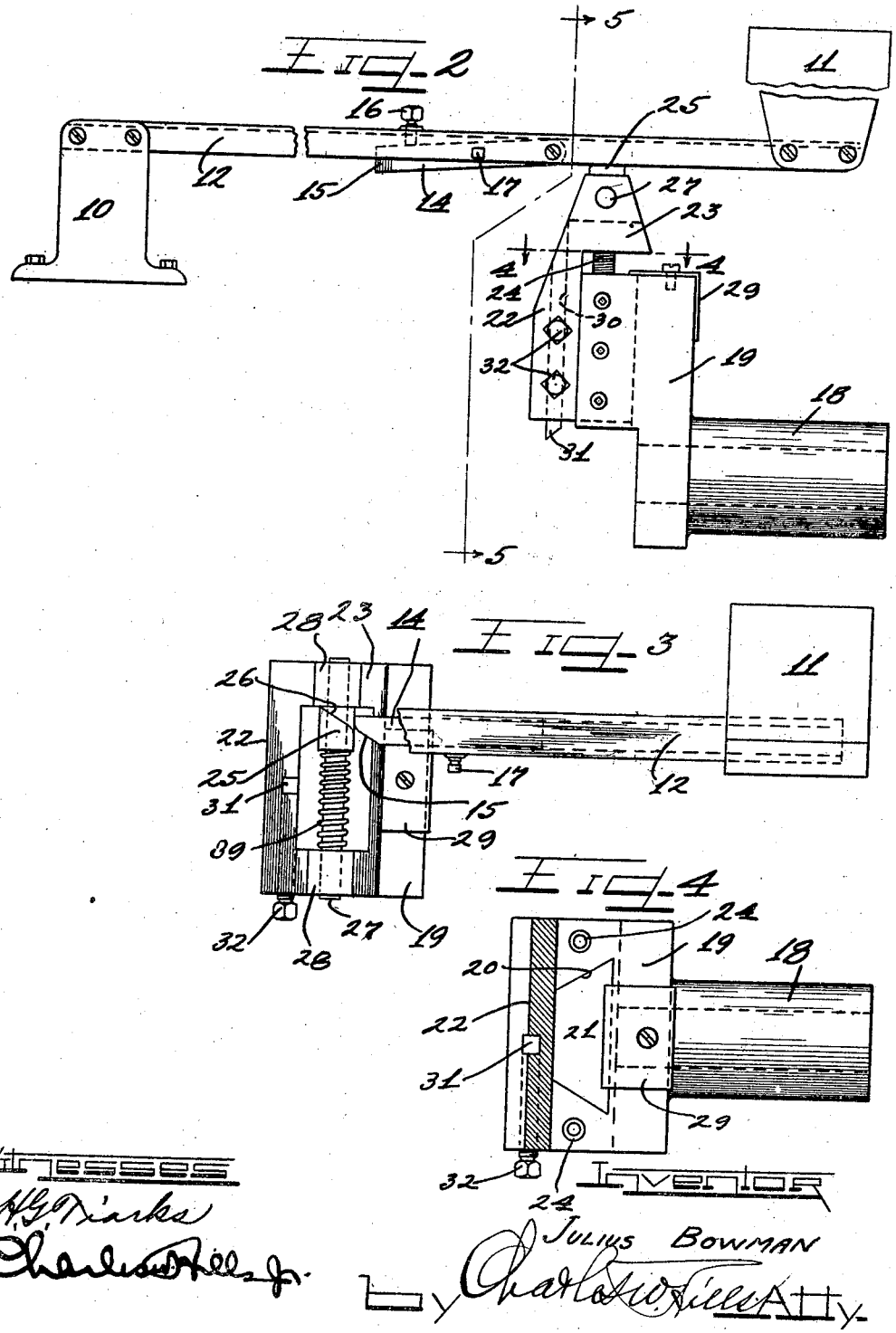

1,521,001

UNITED STATES PATENT OFFICE.

JULIUS BOWMAN, OF CHICAGO, ILLINOIS, ASSIGNOR TO JOHNSON AUTOMOBILE LOCK CO., A CORPORATION OF ILLINOIS.

TAPER ATTACHMENT FOR SCREW MACHINES.

Application filed July 25, 1921, Serial No. 487,499. Renewed September 18, 1924.

*To all whom it may concern:*

Be it known that I, JULIUS BOWMAN, a citizen of the United States, and a resident of the city of Chicago, in the county of Cook and State of Illinois, have invented certain new and useful Improvements in a Taper Attachment for Screw Machines; and I do hereby declare that the following is a full, clear, and exact description of the same, reference being had to the accompanying drawings, and to the numerals of reference marked thereon, which form a part of this specification.

This invention relates more particularly to an improved type of taper attachment for use on screw machines to permit long tapers to be cut when the length of taper is too long to be produced by means of a forming tool.

It is an object of this invention to provide a screw machine taper attachment for producing long lengths of taper.

It is also an object of the invention to provide a screw machine with a taper attachment wherein an adjustable tool holder head is provided with a sliding cam adapted to coact with an adjustable taper guide supported on the machine frame to facilitate the cutting of long tapers.

A further object of the invention is to provide a taper attachment wherein an adjustable taper guide is positioned in the path of a cam carried by a spring-controlled cutting head which is adapted to be adjusted in a tool holder head as the same is advanced to move the cam along said taper guide.

It is furthermore an object of this invention to construct a taper attachment for an automatic screw machine, whereby a taper guide adjustably mounted in a channel guide secured to the machine frame is adapted to permit a slidable cam to track thereon to cause a tool bit carried by a spring-controlled adjustable tool holder head to cut a long taper in stock supported in the machine.

Another object of the invention is to provide a taper attachment wherein a sliding cam when it reaches the end of an adjustable taper guide permits the cutting tool, carried by an adjustable tool holder head, to automatically move out of engagement with stock being cut.

It is an important object of this invention to provide a screw machine with a simple and effective taper attachment adapted to be readily mounted in position on the machine to permit the cutting of long tapers which cannot be cut by the ordinary types of forming tools generally used for the purpose of producing short tapers in stock.

Other and further important objects of this invention will be apparent from the disclosures in the specification and drawings.

The invention (in a preferred form) is illustrated in the drawings and hereinafter more fully described.

On the drawings:

Figure 1 is a fragmentary side elevation of a portion of a screw machine frame equipped with a taper attachment embodying the principles of this invention.

Figure 2 is a side elevation of the taper attachment removed from the machine.

Figure 3 is a top plan view thereof partly broken away.

Figure 4 is a section taken on line 4—4 of Figure 2.

Figure 5 is a view taken on line 5—5 of Figure 2.

Figure 6 is a modified form of cutting head adapted to carry a boring bar.

As shown on the drawings:

Figure 1 illustrates a fragmentary portion of a multiple-spindle automatic screw machine, the parts shown comprising a main frame spindle housing 1 and a main frame upright 2. A beam or tie piece 3 rigidly connects the main frame sections 1 and 2. Supported by the main frame section 1 is a spindle carrier 4 having a plurality of spindle noses 5. A slide 6 is mounted on the spindle carrier 4 adjacent one side of a tool-slide guide 7 at the feed end of the machine. A bar or rod of stock 8, to be tapered, is supported in the machine with one end engaged in one of the spindle noses 5. The slide 6 is longitudinally grooved to permit tool carrier 9 to be clamped in an adjusted position thereon. Only one tool carrier 9 is shown in position in Figure 1.

The taper attachment of this invention comprises a pair of brackets 10 and 11 rigidly connected to one another by a channel guide bar 12. The bracket 10 is bolted or otherwise secured to an angle member 13 attached to the machine frame section 1. The second bracket 11 is rigidly secured to the machine tie-piece 3. Pivotally mounted in the channel guide bar 12 is one end of an adjustable taper guide 14, the other end of which is chamfered at one side at 15. An adjusting screw 16 is threaded into the channel guide bar 12 and contacts the taper guide 14 to hold the taper guide in an adjusted position. A set screw 17 projects through one side of the channel guide bar 12 and engages the taper guide to hold the same locked in an inclined predetermined or set position of adjustment.

Secured in the passaged machine head 9 is the shank 18 of a tool holder head 19. The tool holder head 19 is provided with a vertical dovetail slot 20 in which a dovetail guide 21 is slidably engaged. The dovetail guide 21 is integrally formed on the cutting head 22 the upper end 23 of which projects over the top of the tool holder head 19. Seated in recesses in the tool holder head 19 are two coiled springs 24, the upper ends of which engage the projecting portion 23 of the cutting head 22 to hold the cutting head projected upwardly to permit a cam 25 carried thereby to seat against the channel guide bar 12. The cam 25 is provided with a chamfered or inclined surface 26 and is slidably engaged on a horizontal rod 27 supported by two lugs 28 integrally formed on the top of the cutting head. A spring 39 is coiled around the rod 27 between the cam 25 and one of the cutting head lugs 28 to hold the cam projected to track beneath the channel guide 12. To limit the upward movement of the cutting head 22 an angle stop 29 is secured upon the tool holder head 19 and projects over the upper end of the dovetail slot 20 to afford a stop for the dovetail guide 21. The cutting head 22 is provided with a vertical squared passage 30 in which a tool bit 31 is engaged. Set screws 32 are used to hold the tool bit 31 in adjusted position.

The modified style of cutting head illustrated in Figure 6 is substantially the same as that already described with the exception that the tool passage 30 is omitted and an opening is provided for receiving one end of a boring bar 33. A boring tool 34 is carried by the projecting or outer end of the boring bar 33.

The operation is as follows:

When a long taper is to be cut in a piece of stock 8, the taper guide 14 is first adjusted by means of the adjusting screw 16 and the set screw 17. The springs 24 acting on the slidable cutting head serve to hold the cam 25 in contact with the channel guide bar 12 at the feed end of the machine. When the automatic screw machine is set in operation the slide 6 is advanced on the spindle carrier 4 thereby causing the tool bit 31 to be advanced over the rotating stock 8.

With the advance of the cutting head 22 the sliding cam 25 is brought into engagement with the highest end of the taper guide 14 and tracks against the under inclined surface thereof. The cutting head is thereby caused to gradually move downwardly against the action of the control springs 24 which are compressed. The tool bit 31 as it advances gradually cuts deeper and deeper into the stock 8 to cut a long taper therein.

When the sliding cam 25 reaches the taper or lower end of the taper guide 41 the springs 24 act automatically to raise the cutting head 22, thereby lifting the tool bit 31 out of engagement with the stock 8 and positioning the cam 25 adjacent the tapered end of the taper guide 14 as illustrated in Figure 3.

Upon the return movement of the slide 6 the cutting head 22 is retracted thereby causing the inclined surface 26 of the spring-controlled slidable cam 25 to slide outwardly on the inclined surface 15 of the taper guide 14. The cam spring 39 is thus compressed and the cam 25 tracks over one side of the taper guide 14. As soon as the taper guide 14 is passed the spring 39 acts to project the cam 25 back into normal position underneath the channel guide bar 12, as shown in Figure 5, ready for the next operation.

In case a piece of stock is to be bored with a long taper the boring attachments 33 and 34 are used in place of the tool bit 31. The operation of the taper attachment is the same as that already described.

I am aware that numerous details of construction may be varied through a wide range without departing from the principles of this invention, and I therefore do not purpose limiting the patent granted otherwise than necessitated by the prior art.

I claim as my invention:

1. A screw machine taper attachment comprising a pair of brackets, a channel guide connecting the same, a taper guide pivotally engaged in said channel guide, means for adjusting said taper guide, a spring-controlled cam coacting with said taper guide, a spring-controlled cutting head supporting said cam adapted to move first outwardly and then upwardly at the end of its operative stroke whereby on the return stroke said taper guide and said cam are out of operative engagement, a tool carried by said cutting head, a support for said cutting head, and means thereon for limiting the upward movement of said cutting head.

2. A screw machine taper attachment comprising a grooved tool holder head, a shank thereon for mounting the same, a cutting head slidably engaged with said tool holder head, springs on said tool holder head for holding said cutting head in an elevated position, a stop on said tool holder head for limiting the upward movement of said cutting head, a tool carried by said cutting head, means for removably holding said tool in an adjusted cutting position, a rod mounted on said cutting head, a cam slidably engaged on said rod, a spring on said rod controlling said cam, a channel guide, means for mounting the same on the frame of a screw machine, and a taper guide adjustably engaged on said channel guide in position to permit the slidable cam to coact therewith during a tapering operation.

3. A tapering attachment comprising a pair of mounting brackets, a guide channel supported thereon, a taper guide pivotally engaged with said guide channel, a screw for adjusting said taper guide, a set screw on said guide channel for holding said taper guide set in an adjusted position, a machine head bracket adapted to be mounted on the turret slide of a screw machine, a tool holder head secured to said machine head bracket, said tool holder head having a dovetail groove therein, a grooved cutting head, a dovetail thereon slidably engaged in said dovetail groove, a tool carried by said cutting head, springs on said tool holder head for holding said cutting head in an elevated position, a stop on said tool holder head adapted to be engaged by said dovetail to limit the movement of said cutting head, lugs formed on the top of said cutting head, a rod supported by said lugs, a cam slidably engaged on said rod between said lugs, and a spring on said rod adapted to hold said cam projected against one of said lugs and beneath said channel guide in position to coact with the taper guide.

4. In a screw machine the combination with the frame and the turret slide thereof, of a machine head bracket clamped on said turret slide, a tool holder head secured to said machine head bracket, a cutting head slidably engaged therewith, a tool bit carried by said slidable cutting head, springs on said tool holder head for supporting the cutting head, a spring-controlled slidable cam on said cutting head, and an adjustable taper guide supported on the machine frame in position to afford a guide for the cam to permit the tool bit to cut a long taper in a piece of stock supported in the screw machine.

5. The combination with a screw machine frame and the turret slide thereof, of a channel guide supported on the machine frame, a taper guide adjustably secured thereto, a machine head bracket secured on said turret slide, a tool holder head thereon, a cutting head adjustably engaged on said tool holder head, a tool carried thereby, and a cam adjustably mounted on said cutting head for coaction with said taper guide on the operative stroke and means for moving the cam out of operative engagement before the commencement of the return stroke.

6. A screw machine taper attachment comprising a guide bar, a taper guide adjustably engaged thereon, a tool holder head, a cutting head slidably engaged thereon, and a cam slidably mounted on said cutting head adapted to track along said taper guide on the operative stroke to adjust the cutting head and over said taper guide on the return stroke.

7. A screw machine taper attachment comprising a guide bar, a taper guide supported thereon, a tool holder head, a cutting head slidably engaged therewith, springs between said tool holder head and said cutting head for holding the cutting head in an elevated position, a tool carried by said cutting head, and a spring-controlled cam slidably mounted on said cutting head adapted to coact with said taper guide to cause adjustment of said cutting head and the tool carried thereby.

8. The combination with the frame of a screw machine, of brackets secured thereon, a grooved guide bar connecting said brackets, a taper guide pivoted in said grooved guide bar, means for holding the taper guide in an adjusted position, a spring controlled cam adapted to track along said taper guide, a spring-controlled cutting head supporting said cam, and a tool carried by said cutting head for cutting a long taper in a piece of stock when the cutting head is advanced to cause the cam to track on said taper guide.

9. A screw machine taper attachment comprising a channel guide, brackets for supporting the same, a taper guide adjustably supported on said channel guide, a supporting mechanism forming a part of the screw machine adapted to be advanced and retracted, a cutting head slidably supported on said supporting mechanism, a tool carried thereby, a cam carried by the cutting head, and resilient means between said supporting mechanism and said cutting head, said cam adapted to track beneath said taper guide during an advance of the supporting mechanism and along one side of the taper guide when the supporting mechanism is retracted.

In testimony whereof I have hereunto subscribed my name in the presence of two subscribing witnesses.

JULIUS BOWMAN.

Witnesses:
J. F. KELLY,
HELEN BAUER.